United States Patent [19]

Miles

[11] Patent Number: 4,673,244

[45] Date of Patent: Jun. 16, 1987

[54] METHOD OF ALIGNING A POLARIZATION-PRESERVING OPTICAL FIBER WITH A SEMICONDUCTOR LASER FOR ATTACHMENT OF THE FIBER TO THE LASER

[75] Inventor: Ronald O. Miles, Falls Church, Va.

[73] Assignee: Sachs/Freeman Associates, Inc., Landover, Md.

[21] Appl. No.: 603,414

[22] Filed: Apr. 24, 1984

[51] Int. Cl.⁴ .......................... G02B 6/36; G02B 6/30
[52] U.S. Cl. ........................... 350/96.20; 350/96.10; 350/96.17; 350/96.29; 350/96.30; 350/320; 350/370
[58] Field of Search ............... 350/96.10, 96.15, 96.17, 350/96.18, 96.20, 96.21, 96.29, 96.30, 320, 370, 379, 383, 387, 400, 407; 372/6, 7; 250/227

[56] References Cited

U.S. PATENT DOCUMENTS

| | | | |
|---|---|---|---|
| 4,065,203 | 12/1977 | Goell et al. | 350/96.20 |
| 4,296,998 | 10/1981 | Dufft | 350/96.20 |
| 4,372,644 | 2/1983 | Unger | 350/96.20 |
| 4,560,246 | 12/1985 | Cotter | 350/320 X |
| 4,563,639 | 1/1986 | Langeac | 350/96.29 X |
| 4,584,470 | 4/1986 | Iizuka et al. | 350/96.30 X |
| 4,603,941 | 8/1986 | Fujii et al. | 350/96.20 X |

FOREIGN PATENT DOCUMENTS 58-203412  11/1983  Japan .............................. 350/96.20

OTHER PUBLICATIONS

Stolen et al., "Faraday Rotation in Highly Birefringent Optical Fibers" Applied Optics, vol. 19, No. 6, 3/80, pp. 842–845.
Ida et al., "New Method for Polarization . . ." Electronics Lett. 11/84, 2 pgs.
Takada et al., "Measurement of Spatial Distribution . . ." Optics Lett., vol. 11, No. 10 10/86, pp. 680–682.
Miles et al., "Attaching Single Mode Polarization--Preserving Fiber to Single-Mode Semiconductor Laser" Applied Optics, vol. 23, No. 7, 4/1/84, pp. 1096–1099.

Primary Examiner—William L. Sikes
Assistant Examiner—Brian M. Healy
Attorney, Agent, or Firm—Schwartz, Jeffery, Schwaab, Mack, Blumenthal & Evans

[57] ABSTRACT

A method of aligning the polarization-preserving axis of a receiving end of a polarization-preserving optical fiber with the linearly-polarized output of a semiconductor laser in which the fiber optic end is placed substantially adjacent the laser rather than being separated from the laser by a polarizing optical system.

24 Claims, 4 Drawing Figures

METHOD OF ALIGNING A POLARIZATION-PRESERVING OPTICAL FIBER WITH A SEMICONDUCTOR LASER FOR ATTACHMENT OF THE FIBER TO THE LASER

The United States Government has rights in this invention pursuant to a contract awarded by the U.S. Navy (Navy Case No. 68019).

BACKGROUND OF THE INVENTION

This invention relates to a method of aligning an end of a polarization-preserving optical fiber for attachment to a linearly polarized (plane polarized) semiconductor laser.

The performance of various optical equipment such as electro-optic sensors, fiber gyroscopes, and coherent communications equipment can be considerably enhanced by using optical fibers which preserve the polarization of the light they carry. At least two types of polarization-preserving optical fibers are known in the art. One type has a core which is very elliptical. The other type is made of a birefringent material, i.e., a material which exhibits different indices of refraction for different polarizations. However, polarization in this second type of fiber is maintained by means of two distinct axes of propagation determined by the birefringent dielectric medium of the core material. Either type of polarization-preserving fiber has the property that light entering the fiber which is polarized parallel to the optical axis of the fiber (i.e., the polarization-preserving axis) will keep its polarization while propagating within the fiber. Polarized light entering off-axis will be scattered while propagating through the fiber, that is, it will lose its polariza- tion.

A measure of the degree of polarization of light is the ratio of maximum transmitted intensity, which will occur in the plane of polarization, to the minimum transmitted intensity, which will occur in the plane orthogonal to the plane of polarization. This ratio is called the extinction ratio, or the polarization ratio, and is usually expressed in decibels.

Polarization-preserving fibers such as those described above are capable of maintaining an extinction ratio in excess of 25 dB.

The first step in obtaining well-polarized output from a polarization-preserving fiber is to provide it with sufficiently polarized light at the start. The total light output of most semiconductor lasers, however, is relatively poorly polarized. Typical extinction ratios for such devices, considering total light output over the entire area of the beam, are only on the order of 10-12 dB. In semiconductor lasers where the light mode is guided internally by the gain of the active medium, the emission at the outer edges of the medium is largely dominated by absorption. This results in a beam which has a spatial distribution of unpolarized emission which decreases from the edge of the beam to the center of the beam so that there is better polarized light toward the center of the beam than there is at its edges.

The next step in obtaining well-polarized output is proper alignment of the optical axis of the fiber with the direction of polarization of the light source. As stated above, this maximizes the percentage of light which will stay polarized in the fiber. Due to the poor polarization of the light emitted by a semiconductor laser as described above, an alignment set-up such as that depicted in FIG. 1 has been used. The end of fiber 10 is placed within a suitable jig 30, such as a collet-type jig. The end of fiber 10 protruding from jig 30 has been greatly exaggerated for clarity. Interposed between the receiving end of fiber 10 and laser 20 is an optical system designated generally by 40, which typically comprises a convex lens 50, a polarizer 60, and another convex lens 70. The lenses 50 and 70 are used because light from a semiconductor laser is generally highly divergent, so that lenses are necessary to collimate the beam. The emitting end of fiber 10 emits the transmitted laser light into yet another convex lens 80, from which the light travels to a polarizer 90 and detecting means 100. Use of optical system 40 ensures a light source having an extinction ratio on the order of 50-70 dB. Using this apparatus, the fiber is rotated by rotator 35 and the extinction ratio measured, until a maximum in the extinction ratio indicates that the fiber is aligned, i.e., that most of the light is keeping its polarization and not being scattered in the fiber to produce a large amount of light off-axis.

The apparatus described above is not, however, well-suited to perform an alignment in a process for permanent attachment of the fiber to the laser. This is because prior to attachment, all of the coupling optics have to be removed, and then the fiber has to be moved to the laser over relatively long distances. These steps which intervene between alignment and attachment increase the chances that the fiber will ultimately be attached in a misaligned position.

SUMMARY OF THE INVENTION

The present invention is a method for aligning a laser and fiber for attachment which does not involve using separate optics and polarizers between the fiber and laser to align them. Instead, the polarization-preserving fiber itself is used as a spatial filter for eliminating the randomly polarized light at the periphery of the beam. This eliminates the need for post-alignment movement of the fiber to the laser which undersirably increases the likelihood of loss of alignment before attachment. It was quite unexpected and surprising that the polarization-preserving fiber itself would function as a spatial filter, i.e., the fiber aperture reduced the amount of randomly polarized light coupled from the laser and admitted only that portion of the laser output that was relatively well polarized. The procedure according to the present invention offers a simple and efficient method of aligned attachment particularly suitable for permanently attaching a fiber and laser in a production-scale basis.

In essence, the method according to the present invention involves bringing a receiving end of a polarization-preserving optical fiber substantially adjacent to the laser itself, rather than close to an intermediate polarizing optical system, and then measuring an extinction ratio of laser light emitted through the emitting end of the fiber, rotating the receiving end of the fiber in a given direction, and re-measuring the extinction ratio. The steps of measuring the extinction ratio and rotating the fiber are repeated until the remeasured extinction ratio indicates that a desired alignment of the fiber end has been achieved. The procedure may be reiterated with smaller incremental degrees of rotation to achieve greater accuracy. When the fiber is aligned with the desired degree of accuracy, it may be simply attached in place.

BRIEF DESCRIPTION OF THE DRAWINGS

A method according to the present invention will be understood more completely through the following description and reference to the following drawings, in which.

DETAILED DESCRIPTION OF THE PREFERRED EMBODIMENTS

Figure 1:
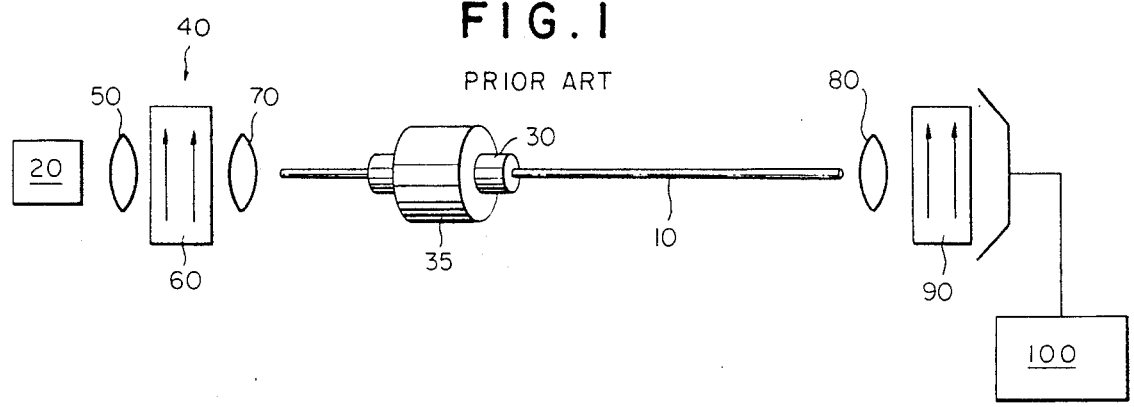
FIG. 1 is a schematic figure of an apparatus such as would have to be used in carrying out a prior art method.
Figure 2:
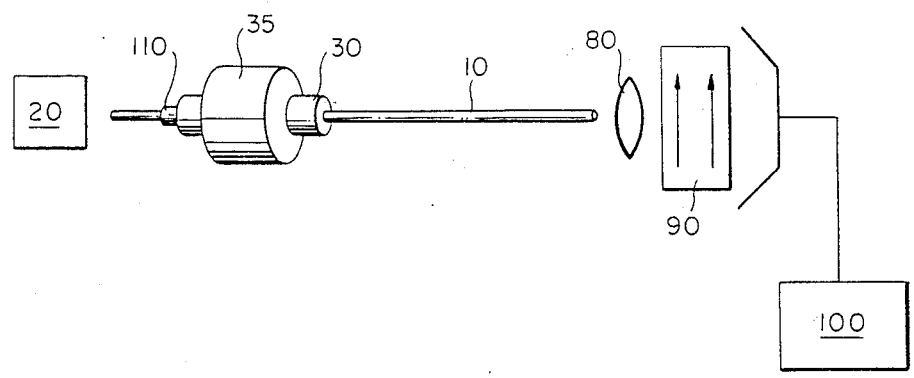
FIG. 2 is a schematic figure of an illustrative apparatus which could be used to carry out a method according to the present invention.

An illustrative apparatus such as could be used to carry out a method according to the present invention is shown in FIG. 2. In FIG. 2, fiber 10, laser 20, jig 30, convex lens 80, polarizer 90, and detecting means 100 are the same as those numbered similarly in FIG. 1. It is noteworthy that optical system 40 of FIG. 1 has no counterpart in FIG. 2 because a method according to the present invention does not require such a system. It is also noteworthy that the receiving end of fiber 10 may be brought closer to laser 20 in the apparatus shown in FIG. 2 than is possible in that shown in FIG. 1.

Before it is inserted in jig 30, the receiving end of fiber 10 is preferably prepared by stripping the jacket. Then mode-stripping is provided over approximately 1 cm of the end. This entails covering the cladding with a black dye or other substance that will absorb light which has made its way into the cladding, and so attenuating cladding-propagated modes. The fiber is then cleaved, i.e., cut transversely of its longitudinal axis to provide a clean end. The cleaved fiber end is then arc-fired and epoxied into a metal ferrule 110 so that the fiber end protrudes less than 1 mm. (As in FIG. 1, the protrusion in FIG. 2 is exaggerated for clarity.) When the fiber end is placed in the ferrule, care is taken that the center of the fiber and the ferrule coincide as nearly as possible, so that movement of the fiber off center when the fiber is rotated is as small as possible. Placing the fiber into the ferrule permits rotating and otherwise manipulating the fiber with lessened risk of distorting or damaging the fiber.

Once completed, the fiber end encased in ferrule 110 is placed in jig 30. Jig 30 containing the fiber is then mounted within a rotator 35, which is any device capable of controllably, precisely, incrementally, and reversibly rotating an object mounted therein.

While jig 30 is mounted in the rotator, it is preferred to perform a rough aligning procedure which may eliminate some tedious searching later on. This is done by illuminating the emitting end of fiber 10 (i.e., the end not encased within the ferrule) with white light, observing the illuminated elliptical cross section at the receiving end through a microscope, and rotating the fiber until the major axis of the elliptical cross section is substantially parallel to the anticipated plane of polarization of the laser light.

Figure 3:
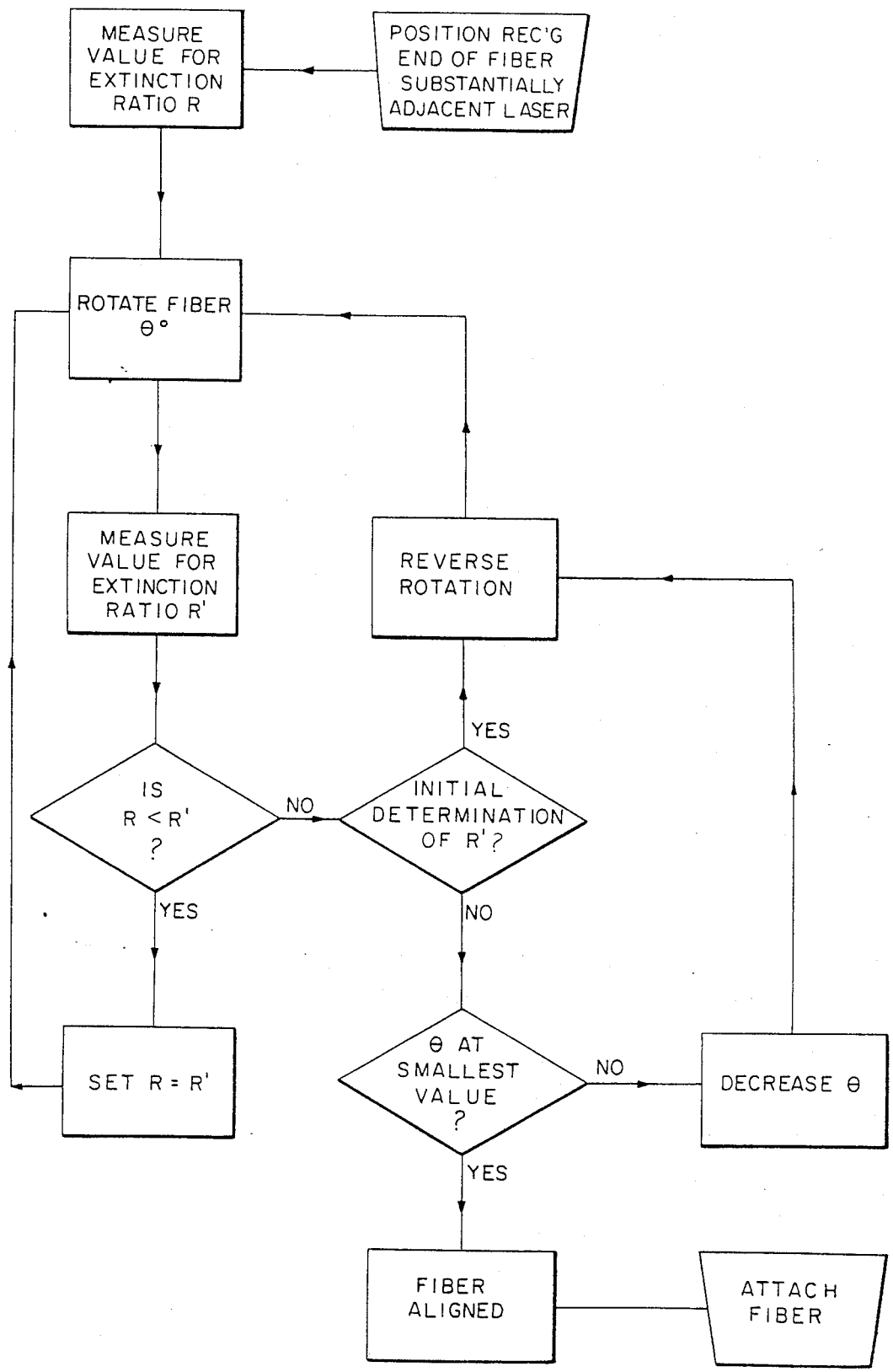
FIG. 3 is a flowchart of an illustrative method according to the present invention.

After the preliminary alignment has been completed, the fiber/rotator assembly is placed on a translational stage and the process outlined in FIG. 3 commences. The translational stage may be any conventional device for controllably producing translational motion, preferably having a resolution of at least 0.1 μm. The receiving end of fiber 10 encased within the ferrule is positioned substantially adjacent to laser 20. The distance should generally be such that a fiber having a given acceptance angle can capture an optimal amount of polarized light from a laser having a given divergence angle. This is generally accomplished by bringing the receiving end of fiber 10 to within 15–30 μm of the laser. It will be appreciated, however, that the exact distance will vary according to the particular fiber and laser being used. The receiving end of the optical fiber is thus directly illuminated by polarized light emitted from the laser, and light is transmitted through the fiber.

At this point, another preliminary alignment can be performed by removing polarizer 90 and positioning fiber 10 for maximum throughput. The polarizer is then replaced and rotated for maximum throughput as observed with detector 100.

Once the coarse adjustments have been made, fine adjustment of the angular position of fiber 10 with respect to the direction of polarization of laser 20 is performed. Polarizer 90 is rotated until a maximum value of intensity transmitted through the polarizer is obtained, and this value is noted as I(max). Polarizer 90 is then rotated approximately 90° until the minimum value of transmitted intensity is obtained, and this value is noted as I(min). The ratio of I(max) to I(min) is then noted as the extinction ratio R for the then-current fiber angular orientation.

The extinction ratio is of interest because it is a measure of the amount of light which has remained polarized. This light ideally contributes exclusively to I(max), and not at all to I(min). Light which was scattered because it entered off-axis due to misalignment contributes equally to both quantities. Thus, by maximizing the ratio of I(max) to I(min), one maximizes the amount of light retaining its polarization, and minimizes the amount of light contributing to I(min).

Fiber 10 is then rotated through an angle $\theta$, preferably a few degrees at this stage of the procedure, and the extinction ratio is measured again and noted as a new value, say, R'.

At this point, R is compared with R'. If R is less than R', then the original direction of rotation is in the direction of an angular position corresponding to a maximum extinction ratio. In this event, the new value for the extinction ratio R' becomes the new reference value R, and rotation in the original direction, measurement of an extinction ratio R', and comparison of R' and the highest value of R yet obtained will continue until R' is determined to be equal to or smaller than any previously measured extinction ratio. At this point, the fiber angular position resulting in a maximum extinction ratio has been passed.

Alternatively, if R' is determined to be less than R in the initial comparison, then the original direction of rotation is proceding away from a fiber angular position corresponding to a maximum in the extinction ratio. Thus, the next appropriate step is to reverse the direction of rotation and proceed as above.

In the rare event that R'=R (indicating that the first rotation symmetrically bracketed a maximum), or after it is determined, as above, that a local maximum in the extinction ratio has been passed, it may be desirable to reverse rotation direction and search for the extinction ratio maximum using a smaller incremental angle θ. (It is assumed that because of the coarse alignment steps preferably taken prior to this time, measurement of equal extinction ratios identifies a bracketed maximum, not minimum. If it were a minimum, as identified by further rotation, then the fiber should continue to be rotated in the original direction of rotation.) The procedure is the same as described above, except that it is assured that rotation is proceeding toward a maximum, so that there is no need to verify that rotation is proceeding in the proper direction. The desirability of continued searching, as well as selection of a new, smaller value for θ, depends on the desired degree of precision, and also depends on the degree of change in the extinction ratio with successive rotations. If the extinction ratio is changing very little with successive turns, then it would be apparent that there would be little to gain from perfectly precise location of the maximum extinction ratio, and it would be preferred to terminate the alignment procedure.

Figure 4:
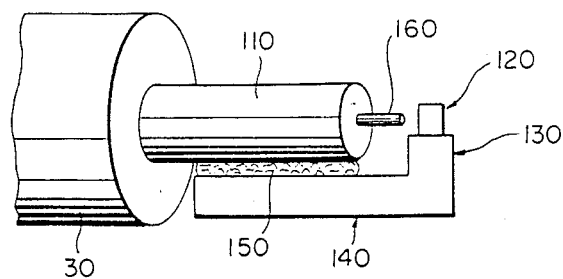
FIG. 4 is a schematic diagram of a mount such as could be used in ultimately attaching a laser to a fiber aligned according to the present invention.

Once θ has been reduced to the smallest desired precision, and the immediate neighborhood of a maximum extinction ratio as a function of fiber end angular position has been determined, as above, the fiber is aligned within the desired tolerance. All that remains is to attach the fiber to the laser. This is preferably accomplished using the apparatus depicted in FIG. 4. Laser chip 120 is assumed to be already disposed atop a pedestal platform 130, which is preferably integrally connected with submount platform 140. Once alignment is completed, ferrule 110 is bonded to submount platform 140 using any suitable bonding material. The bonding material may be an epoxy or if the fiber is metallized it may be a solder. This secures fiber tip 160 in the correct range from, and alignment with, laser chip 120. If desired, the coefficients of thermal expansion of fiber and solder bonding material may be matched to prevent displacements caused by changes in temperature.

It is possible that the bonding material 150, while setting up, may move ferrule 110 out of its aligned position. To compensate for this effect, transmission through fiber 10 may be monitored during the setting-up period, and slight correcting adjustments made to the position of ferrule 110. This permits permanent alignment of fiber and laser with only a few percent loss in extinction ratio during curing. Depending on the bonding material used, laser-to-fiber coupling can remain high over a reasonable temperature variation. For most epoxy bonds, this range could be 10° C. With metallized bonds, it is possible to maintain coupling over 25° C.

The birefingence of the fiber creates a remote possibility that laser light received into the fiber between the axes of propagation will emerge from the fiber as linearly polarized light. This can occur when the interaction length (beat length) is such that the fiber is an integral multiple of half-beat lengths long. It is possible to determine whether linearly polarized light is due to this effect by shortening the fiber at its output end by a random length and re-measuring the extinction ratio. When a fiber is properly aligned, the extinction ratio should be relatively independent of fiber length.

The present invention has been related above in terms of a description of a basic process with several preferred variations. It is to be understood that this description is exemplary only, and does not set forth every way in which the method of the present invention may be carried out. The range of ways in which the present invention may be carried out is therefore not limited to the examples described above, but is instead limited only according to the following claims.

What is claimed is:

1. A method of aligning a receiving end of a polarization-preserving optical fiber with a semiconductor laser comprising the steps of:
   (a) positioning the receiving end substantially adjacent to the laser;
   (b) measuring an extinction ratio at the position of step (a);
   (c) rotating the fiber a desired amount;
   (d) remeasuring the extinction ratio at the position of step (c); and
   (e) repeating steps (c) and (d) as necessary until the remeasured extinction ratio indicates that a desired alignment has been achieved.

2. A method as claimed in claim 1, wherein the measuring and remeasuring steps each comprise:
   rotating a polarizer adjacent an emitting end of the fiber to obtain maximum transmission of light through the polarizer;
   noting the value I(max) of the intensity of the maximum transmission;
   rotating the polarizer approximately 90° to obtain minimum transmission of light through the polarizer;
   noting the value I(min) of the intensity of the minimum transmission; and
   calculating the ratio of I(max) to I(min).

3. A method as claimed in claim 1 comprising an additional step before step (a) of concentrically encasing the receiving end in a rotatable casing.

4. A method as claimed in claim 3, wherein the fiber has a core having an elliptical cross section, further comprising an additional step between steps (a) and (b) of coarsely aligning the receiving end by transmitting light into the emitting end through the fiber out of the receiving end, and rotating the receiving end until the major axis of the elliptical cross section is in an anticipated plane of polarization of light emitted by the laser.

5. A method as claimed in claim 3, further comprising the steps of:
   (f) attaching the ferrule to the laser with a bonding material;
   (g) monitoring fiber output while the bonding material sets up and
   (h) repositioning the receiving end in a direction opposite that in which monitored fiber output indicates that the bonding material while setting up is displacing the receiving end out of alignment.

6. A method of aligning a receiving end of a polarization-preserving optical fiber with a semiconductor laser comprising the steps of:
   (a) positioning the receiving end substantially adjacent to the laser;
   (b) measuring a value R of an extinction ratio of light emitted by the laser and transmitted through the fiber;
   (c) rotating the receiving end through an angle θ;
   (d) measuring a value R' of an extinction ratio of light emitted by the laser and transmitted through the fiber;
   (e) comparing R with R';
   (f) setting R equal to R' and repeating steps (c)–(f) if it is determined in comparing step (e) that R is less than R' and proceeding to step (g) if R is not less than R';

(g) determining whether step (d) has been performed more than once;

(h) reversing the direction in which the fiber end is rotated and repeating steps (c)–(h) if it is determined in step (g) that step (d) has not been performed more than once and proceeding to the next step if (d) has been performed more than once; and (k) terminating the alignment procedure.

7. A method as claimed in claim 6, wherein the measuring steps (b) and (d) further comprise the steps of:

orienting a polarizer adjacent an emitting end of the fiber to obtain maximum transmission of light through the polarizer;

noting the value I(max) of the intensity of the maximum transmission;

rotating the polarizer approximately 90° to obtain minimum transmission of light through the polarizer;

noting the value I(min) of the intensity of the minimum transmission; and calculating the ratio of I(max) to I(min).

8. A method as claimed in claim 6, further comprising the steps between steps (h) and (k) of:

(i) determining whether θ is equal to a predetermined minimum value; and (j) decreasing θ by a predetermined amount and repeating steps (c)–(j) if it is determined in step (i) that θ is not equal to the predetermined minimum value and proceeding to step (k) if θ is equal to the predetermined minimum value.

9. A method as claimed in claim 6 further comprising before step (a) the step of concentrically encasing the receiving end of the fiber in a rotatable casing.

10. A method as claimed in claim 9 further comprising the steps of:

(l) attaching the casing to the laser using a bonding material;

(m) monitoring fiber output while the bonding material sets up; and (n) repositioning the receiving end if monitored fiber output indicates that the bonding material while setting up is moving the fiber out of alignment in a direction counter to that of the movement due to the setting up.

11. A method as claimed in claim 6, wherein the fiber has a core having an elliptical cross section, further comprising an additional step between steps (a) and (b) of coarsely aligning the receiving end by transmitting light into the emitting end through the fiber out of the receiving end, and rotating the receiving end until the major axis of the elliptical cross section is in an anticipated plane of polarization of light emitted by the laser.

12. A method as claimed in claim 5, wherein the receiving end of said fiber is metallized, and said bonding material is a solder.

13. A method as claimed in claim 12, wherein the coefficients of thermal expansion of the fiber and the solder are matched to each other.

14. A method as claimed in claim 5, wherein said bonding material is an epoxy adhesive.

15. A method as claimed in claim 10, wherein the receiving end of said fiber is metallized, and said bonding material is a solder.

16. A method as claimed in claim 15, wherein the coefficients of thermal expansion of the fiber and the solder are matched to each other.

17. A method as claimed in claim 10, wherein said bonding material is an epoxy adhesive.

18. A method of aligning a receiving end of a polarization-preserving optical fiber with a means for emitting coherent light comprising the steps of:

(a) positioning the receiving end substantially adjacent of the coherent light emitting means;

(b) measuring an extinction ratio at the position of step (a);

(c) rotating the fiber a desired amount;

(d) remeasuring the extinction ratio at the position of step (c); and (e) repeating steps (c) and (d) as necessary until the remeasured extinction ratio indicates that a desired alignment has been achieved.

19. A method as claimed in claim 18, wherein the measuring and remeasuring steps each comprise:

rotating a polarizer adjacent an emitting end of the fiber to obtain maximum transmission of light through the polarizer;

noting the value I(max) of the intensity of the maximum transmission;

rotating the polarizer approximately 90° to obtain minimum transmission of light through the polarizer;

noting the value I(max) of the intensity of the minimum transmission; and calculating the ratio of I(max) to I(min).

20. A method as claimed in claim 18, wherein the fiber has a core having an elliptical cross section, further comprising an additional step between steps (a) and (b) of coarsely aligning the receiving end by transmitting light into the emitting end through the fiber out of the receiving end, and rotating the receiving end until the major axis of the elliptical cross section is in an anticipated plane of polarization of light emitted by the laser.

21. A method as claimed in claim 18, wherein said receiving end of the fiber is encased in casing means further comprising the steps of:

(f) attaching the casing means to the laser with a bonding material;

(g) monitoring fiber output while the bonding material sets up and (h) repositioning the receiving end in a direction opposite that in which monitored fiber output indicates that the bonding material while setting up is displacing the receiving end out of alignment.

22. A method of aligning a receiving end of a polarization-preserving optical fiber with a means for emitting coherent light comprising the steps of:

(a) positioning the receiving end substantially adjacent to the coherent light emitting means;

(b) measuring a value R of an extinction ratio of light emitted by the laser and transmitted through the fiber;

(c) rotating the receiving end through an angle θ;

(d) measuring a value R' of an extinction ratio of light emitted by the laser and transmitted through the fiber;

(e) comparing R with R';

(f) setting R equal to R' and repeating steps (c)–(f) if it is determined in comparing step (e) that R is less than R' and proceeding to step (g) if R is not less than R';

(g) determining whether step (d) has been performed more than once;

(h) reversing the direction in which the fiber end is rotated and repeating steps (c)–(h) if it is determined in step (g) that step (d) has not been performed more than once and proceeding to the next step if (d) has been performed more than once; and (k) terminating the alignment procedure.

23. A method as claimed in claim 22, wherein the measuring steps (b) and (d) further comprise the steps of:

orienting a polarizer adjacent an emitting end of the fiber to obtain maximum transmission of light through the polarizer;

noting the value I(max) of the intensity of the maximum transmission;

rotating the polarizer approximately 90° to obtain minimum transmission of light through the polarizer;

noting the value I(min) of the intensity of the minimum transmission; and calculating the ratio of I(max) to I(min).

24. A method as claimed in claim 22, further comprising the steps between steps (h) and (k) of:

(i) determining whether $\theta$ is equal to a predetermined minimum value; and (j) decreasing $\theta$ by a predetermined amount and repeating steps (c)-(j) if it is determined in step (i) that $\theta$ is not equal to the predetermined minimum value and proceeding to step (k) if $\theta$ is equal to the predetermined minimum value.

* * * * *